G. C. HUNTER.
BAND SAW.
APPLICATION FILED JUNE 3, 1912.
1,066,498.
Patented July 8, 1913.
3 SHEETS—SHEET 1.
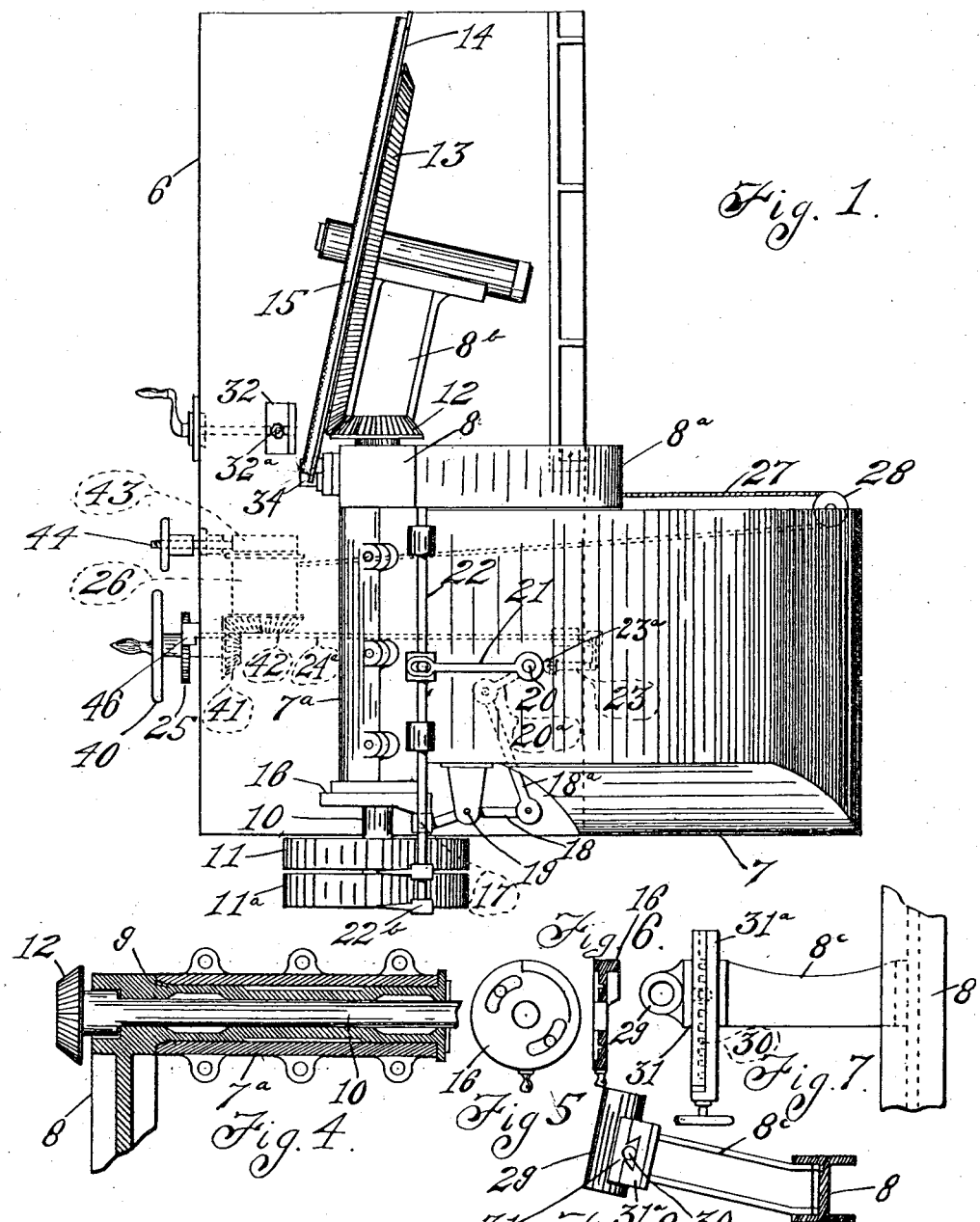
Witnesses
H. L. Richey
C. N. Whitfield
Inventor
George C. Hunter
By John A. Bommhardt
Attorney

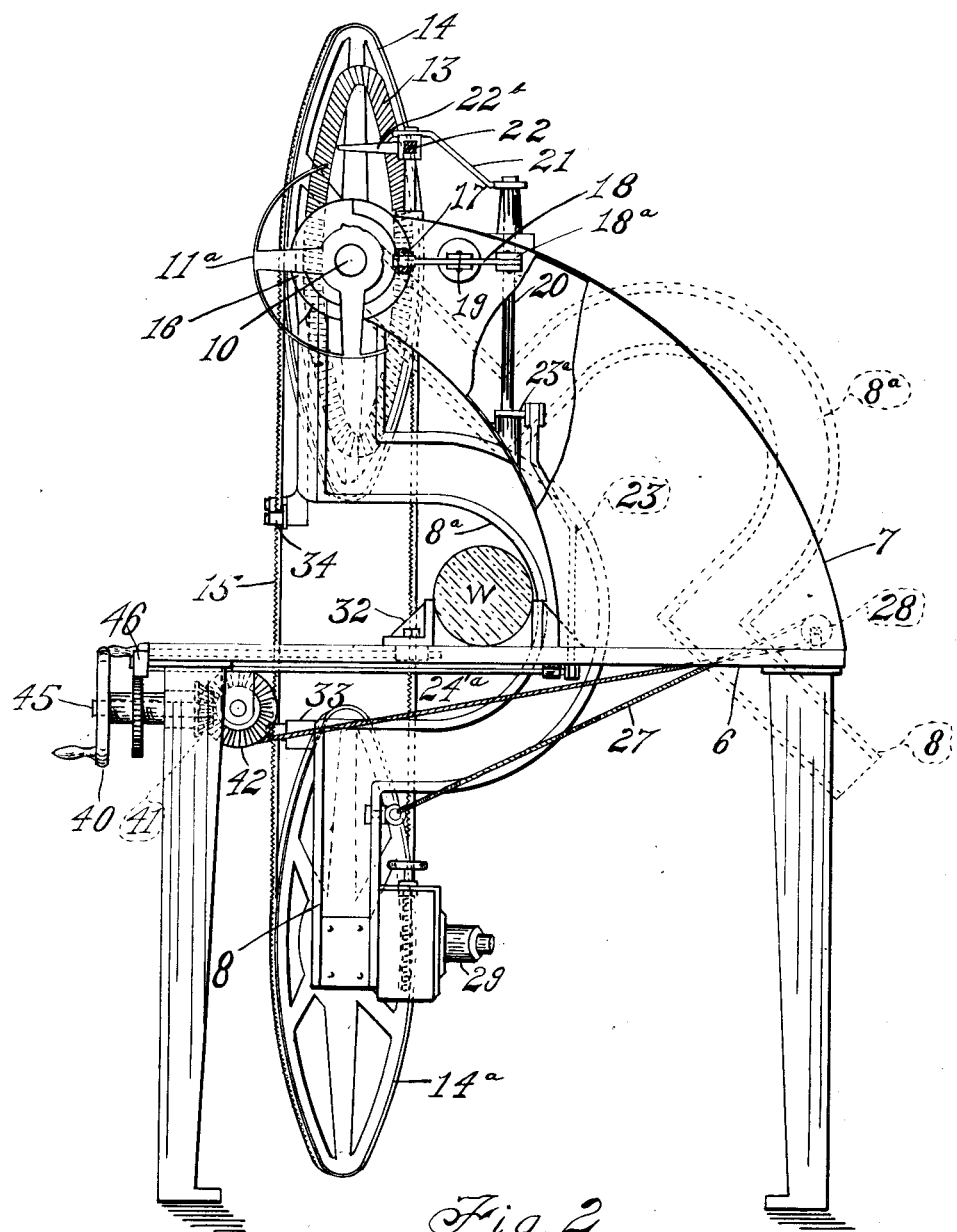

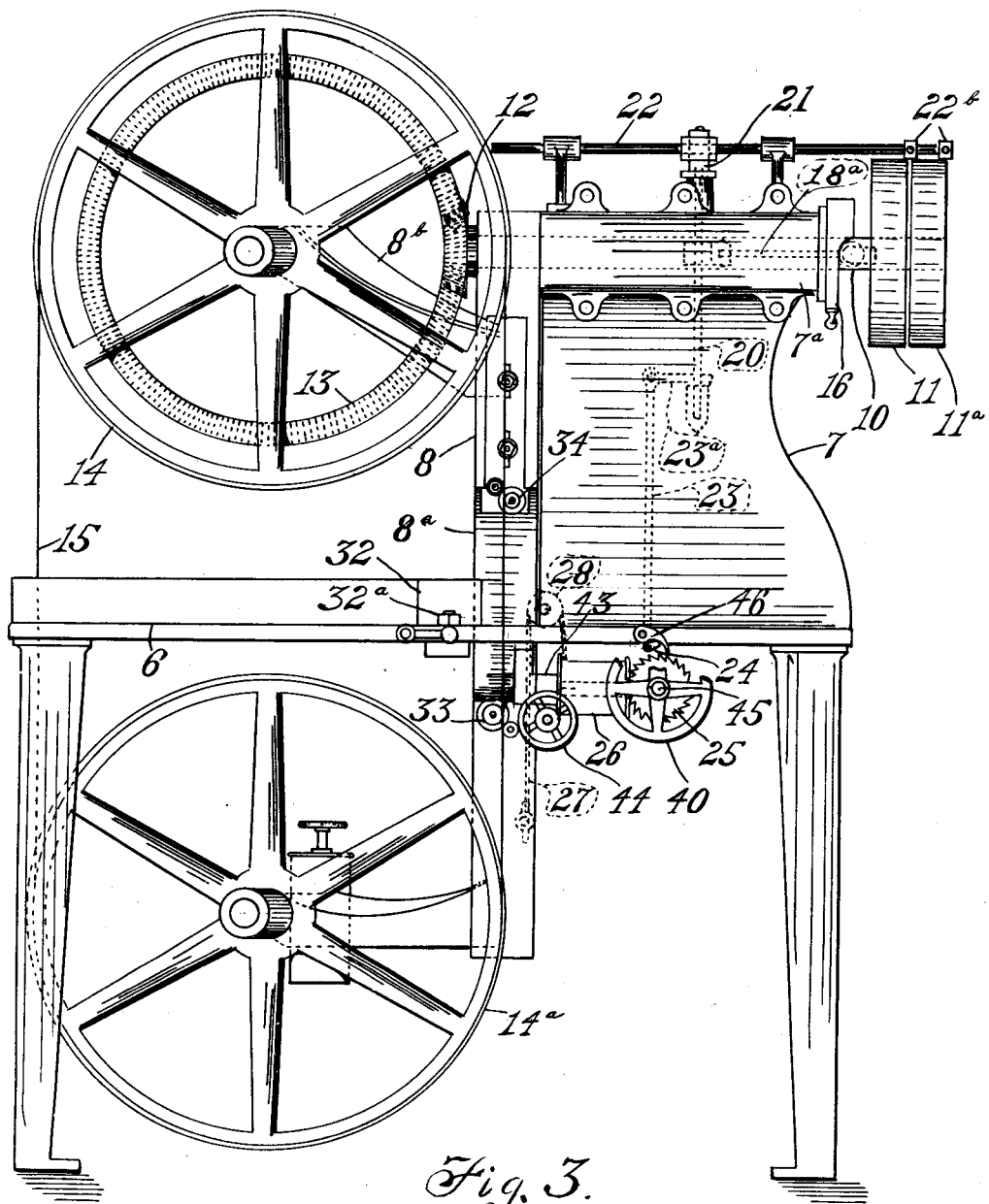

UNITED STATES PATENT OFFICE.

GEORGE C. HUNTER, OF CLEVELAND, OHIO, ASSIGNOR TO HOUGHTON AND RICHARDS, OF BOSTON, MASSACHUSETTS, A FIRM.

BAND-SAW.

1,066,498.   Specification of Letters Patent.   Patented July 8, 1913.

Application filed June 3, 1912. Serial No. 701,279.

*To all whom it may concern:*

Be it known that I, GEORGE C. HUNTER, citizen of the United States, residing at Cleveland, in the county of Cuyahoga and State of Ohio, have invented certain new and useful Improvements in Band-Saws, of which the following is a specification.

This invention relates to band saws, and is characterized by novelty and improvement with respect particularly to the following features: The saw is carried by a swinging frame which oscillates on a horizontal axis located above the table and concentric with the drive shaft, so that the saw can be swung to or from the work, which makes it suitable as a cutting off saw capable of severing metal or other stock. The opposite runs of the saw are placed at an angle to the plane of oscillation, which adapts it for use in cutting off long stock or material, so that the front or cutting run of the band is in advance of the back or return run thereof, which allows the front part to cut off a piece of stock of certain size before the rear part of the saw will come into contact with the rest of the stock. An automatic stop is provided which limits the swing of the saw frame at any desired point, so that after making a cut of a certain depth or distance the swing of the frame is stopped. This serves, for instance, to prevent the return run of the saw coming in contact with the stock. The saw frame is raised by mechanical means, and drops or feeds by gravity, the feed being controlled by means of a suitable brake. The driving shaft of the saw is started and stopped by means of a belt shifter which is operated by a rock shaft operated by a cam carried by the swinging frame, the cam being adjustable, so that the saw is stopped and started in proper time with the swing of the frame whereby the depth of cut may be regulated, or its operation adjusted to the thickness of the stock.

Other minor features of improvement will be apparent from the following description and the accompanying drawings.

In the drawings Figure 1 is a plan of the machine. Fig. 2 is a side elevation. Fig. 3 is a front elevation. Fig. 4 is a section through the main bearing on which the frame oscillates. Figs. 5 and 6 are details of the cam. Figs. 7 and 8 are details of the lower bracket and tension adjustment.

Referring specifically to the drawings, 6 indicates the saw table which supports the heavy standard 7.

8 is a swing frame which has a bowed part $8^a$ about the cutting position. This frame is hung on a pivot sleeve 9 which is mounted to turn in a box $7^a$ at the top of the standard 7, and carries an adjustable cam 16 at its outer end. The main shaft 10 extends through the sleeve in which it finds bearings, and is provided at its outer end with fast and loose pulleys 11 and $11^a$ adapted to receive a suitable driving belt, (not shown).

The upper band wheel or pulley 14 is carried in a box at the end of a bracket arm $8^b$ on the swinging frame 8, the axis of the band wheel being in the same plane as the axis of the shaft 10, and at an angle thereto, so that the band wheel sets at an angle with respect to the line of cut.

The lower band wheel $14^a$ is carried in a journal box 29 mounted on a plate 31 dovetailed for vertical adjustment in a plate $31^a$ at the end of a bracket arm $8^c$ projecting from the lower end of the frame 8, a screw 30 being provided to adjust the slide 31 and so regulate the tension of the band saw 15 which extends around the band wheels. The axes of the band wheels 14 and $14^a$ are parallel. The shaft 10 has at its inner end a pinion 12 which meshes with a gear 13 on the upper band wheel 14, whereby the saw is driven when the shaft 10 is rotated.

The front run of the saw passes between lower guide rolls 33 on the frame 8 and upper guide rolls 34, on the same frame, the upper guides being adjustable. These guide rolls are so positioned that the front or cutting run of the saw is twisted slightly to bring the saw at a right angle to the work, between the guides, to give a square cut, the work being indicated at W and being held in a holder on the table, one of the holder jaws 32 being adjustable to accommodate work of different sizes, and said jaw 32 may be turned on its fastening bolt $32^a$ to accommodate oblique or angular work.

The belt shifter comprises a rod 22 which slides on the standard 7, and carries suitable devices $22^b$ to engage and shift a belt from the fast to the loose pulley and vice versa. This rod is shifted by means of a lever 21 projecting from a vertical rock shaft or rod 20 which has an arm $20^a$ connected by a link 18$^a$ to a lever 18 pivoted at 19 to a bracket on the standard and carrying a roller 17 which runs on the surface of the cam 16, which, as stated, is attached to and rocks with the bearing sleeve 9, so that when the frame 8 and sleeve 9 are swung one way the belt is shifted to the loose pulley to stop the saw and when swung the other way, that is toward the work, the belt is shifted to the fast pulley and the saw is driven. The cam 16 may be varied or adjusted according to the work at hand, so that the roller 17 will run off of the high point of the cam and stop the saw at the completion of the cut.

The saw frame 8 and the parts carried thereby are lifted or swung back by means of a hand wheel 40 the shaft of which carries a bevel pinion 41 meshing with a bevel pinion 42 on the shaft of the drum 26 on which winds a cable 27 which extends through a pulley block 28 and is connected to the back of the frame 8. The drum 26 is provided with a friction band brake 43 operated by a screw and hand nut 44.

The vertical rock shaft 20 is connected at its lower end by an arm 23ª to a lever or arm 23 projecting from a rock shaft 24ª which extends under the table top and carries a trip finger 24 adapted to lift a pawl 46 out of a ratchet or stop wheel 25 mounted on the shaft 45 which as stated is geared to the winding drum.

It will be seen that the angle of the band wheels is such that the cutting or front run of the saw is located in advance of the back or return run of the saw, the angle being conveniently such that the work will be cut through before the rear run of the saw reaches the work. The connections between the rock shaft 20 and the trip finger 24, and the dimensions of the cam 16, are also such that at the limit of any desired stroke the trip finger will allow the pawl 46 to engage with the ratchet 25 and thereby stop the turn of the drum 26 and consequently stop the downward swing of the saw frame, these actions being timed to accord with the shift of the belt from the fast to the loose pulley, so that the saw is stopped, and the swing of the frame is stopped, at substantially the same time.

In operation, the hand wheel 40 is first turned to wind the cable on the drum 26 and thus raise or swing back the frame 8, and as the sleeve 9 turns with the frame the cam 16 by the same movement operates the belt shifter to shift the belt from the loose to the fast pulley, and the saw starts. By releasing the hand wheel 40 the weight of the saw frame and the parts carried thereby causes the frame to swing down at a speed regulated by the brake 43, and the front run of the saw cuts through the work, and having finished the cut the wheel 17 runs off the rise of the cam and the shifter changes the belt from the fast to the loose pulley thereby stopping the saw. At the same time the turn of the rock shaft 20 permits the trip finger 24 to allow the pawl 46 to drop into the ratchet which stops the unwinding of the drum and so stops the downward swing of the saw frame, and the cam will be so constricted or adjusted that this action will take place before the back run of the saw reaches the work. Then the saw frame is swung up for the next operation. Since the axis on which the saw frame swings is concentric with the drive shaft 10, the drive is not effected by the swing of the frame, and the angular position of the band wheels enable pieces to be cut off of long stock or material at the successive operations of the saw. Instead of the friction brake, other retarding devices may be provided to control the downward swing of the saw frame. By removing the cam the belt shifter or machine can be used as an ordinary band saw, as the frame can be allowed to hang in vertical position or tilted to any angle desired and then held at desired position by engaging the pawl 46 or otherwise fastening the winding drum against movement. The dotted lines in Fig. 2 indicate the position of the saw frame when swung up, preliminary to beginning to cut.

What I claim as new is:

1. In a band sawing machine, in combination, a fixed main frame provided with a bearing box, a swinging frame having a pivot sleeve projecting therefrom and mounted to turn in said box, a band saw and its pulleys carried by said swinging frame, and a driving shaft extending axially through said sleeve and geared to one of the pulleys.

2. In a band sawing machine, in combination, a table provided with a standard thereon and a bearing box on said standard, a swinging saw frame adapted to swing beside said standard and having a supporting pivot sleeve projecting therefrom and mounted to turn in said box, a band saw and its pulleys carried by said swinging frame, and a driving shaft extending axially in said sleeve and geared to one of the pulleys.

3. In a band sawing machine, in combination, a table provided with an overhanging standard thereon, and a bearing box at the top of said standard, a swinging saw frame adapted to swing beside said standard and having at one side a projecting sleeve turning in said box and supporting said swinging frame, a band saw and its pulleys carried by said swinging frame, and a driving shaft extending axially through and mounted in bearings in said sleeve and provided with a driving pulley at one end and geared at the other end to one of said pulleys.

4. In a band sawing machine, a swinging frame, a band saw and its pulleys carried thereby, means to drive the saw, a winding drum and its cable connected to the swinging frame to swing the same, and stop devices automatically operated by the swing of the frame and controlling said drum and adapted to stop the movement thereof.

5. In a band sawing machine, the combination of a table and an upright support thereon, a swinging frame pivoted at its upper end to said support above the table and bowed about the cutting position at the table, a band saw and its pulleys carried by said frame, the pulleys being located respectively above and below said bowed portion, so that the lower pulley will swing under the table, and means to drive the saw.

6. In a band sawing machine, the combination of a frame pivoted near its upper end, a winding drum and its cable, the latter being connected to the frame to swing the same upwardly, the frame being adapted to swing downwardly by gravity, a brake engaging the drum, to retard said downward swing, a band saw and its pulleys carried by the frame, and means to drive the saw.

7. In a band sawing machine, the combination of a swinging frame, a band saw and its pulleys carried thereby, a shaft geared to one of the pulleys to drive the saw, driving devices for said shaft, a cam connected to the swinging frame to oscillate therewith, a rock shaft operatively controlling the driving devices to start and stop the same, and means actuated by said cam to operate the shaft.

8. In a band sawing machine, the combination of a supporting standard, a swinging frame provided with a pivot sleeve mounted in a bearing in said standard, a band saw and its pulleys carried by said frame, a drive shaft extending through said sleeve and geared to one of the pulleys, a cam mounted on the sleeve to oscillate therewith, a rock shaft mounted on the standard, a lever bearing against said cam and operated thereby and connected to the rock shaft, and means operated by said rock shaft to start and stop the drive shaft.

9. In a band sawing machine, the combination of a supporting standard, a swinging frame provided with a pivot sleeve mounted in a bearing in said standard, a band saw and its pulleys carried by said frame, a drive shaft extending through said sleeve and geared to one of the pulleys, a cam mounted on the sleeve to oscillate therewith, a rock shaft mounted on the standard, a lever bearing against said cam and operated thereby and connected to the rock shaft, means operated by said rock shaft to start and stop the drive shaft, and means operated by said rock shaft to stop the swing of the frame.

10. In a band sawing machine, a frame pivoted near its upper end to swing down by gravity after its lower end is swung up, a band saw and its pulleys carried by said frame, means to drive the saw, a hoisting mechanism connected to the frame to swing the same up and operable to permit the same to swing down, and means engageable with one of the members of said hoisting mechanism to stop the operation thereof and thereby limit the downward swing of the said frame.

11. In a band sawing machine, a frame pivoted near its upper end to swing down by gravity after its lower end is swung up, a band saw and its pulleys carried by said frame, means to drive the saw, a hoisting mechanism connected to the frame to swing the same up and operable to permit the same to swing down, and means automatically actuated by the downward swing of the frame and engageable with one of the members of said hoisting mechanism to stop the operation thereof and thereby limit the downward swing of the saw frame.

12. In a band sawing machine, a swinging frame, a band saw and its pulleys carried thereby, means to drive the saw, hoisting means operative to swing the frame in one direction and also operative reversely to permit the frame to swing in the opposite direction, means controlled by the swing of the frame to automatically start and stop the driving means, and means controlled by the swing of the frame to automatically stop the said reverse operation of said hoisting means and thereby limit the swing of the frame in said opposite direction.

In testimony whereof, I do affix my signature in presence of two witnesses.

GEORGE C. HUNTER.

Witnesses:
JOHN A. BOMMHARDT,
STEDMAN J. ROCKWELL.